HACHIRO MITSUI
Inventor

By Wendroth Lind & Ponack
Attorneys

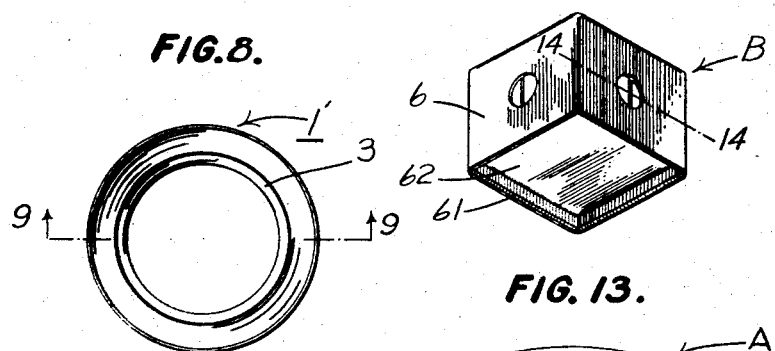
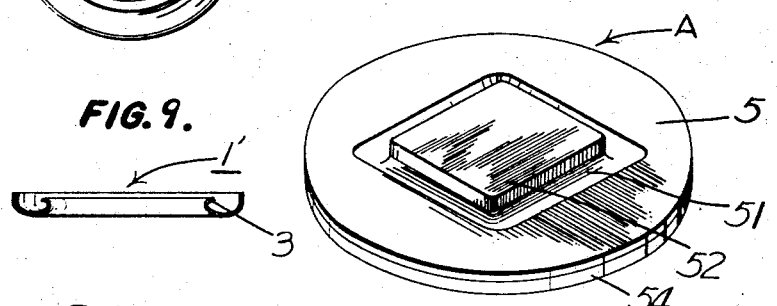
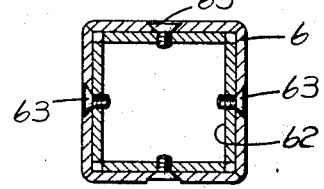
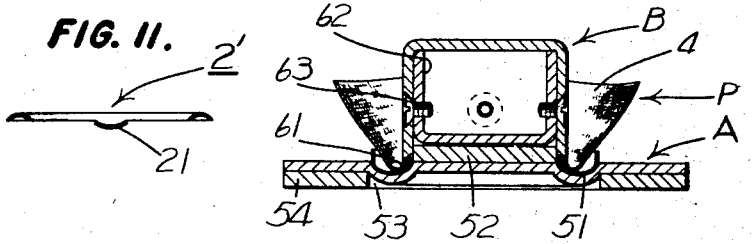

HACHIRO MITSUI
Inventor

Hachiro Mitsui
Inventor

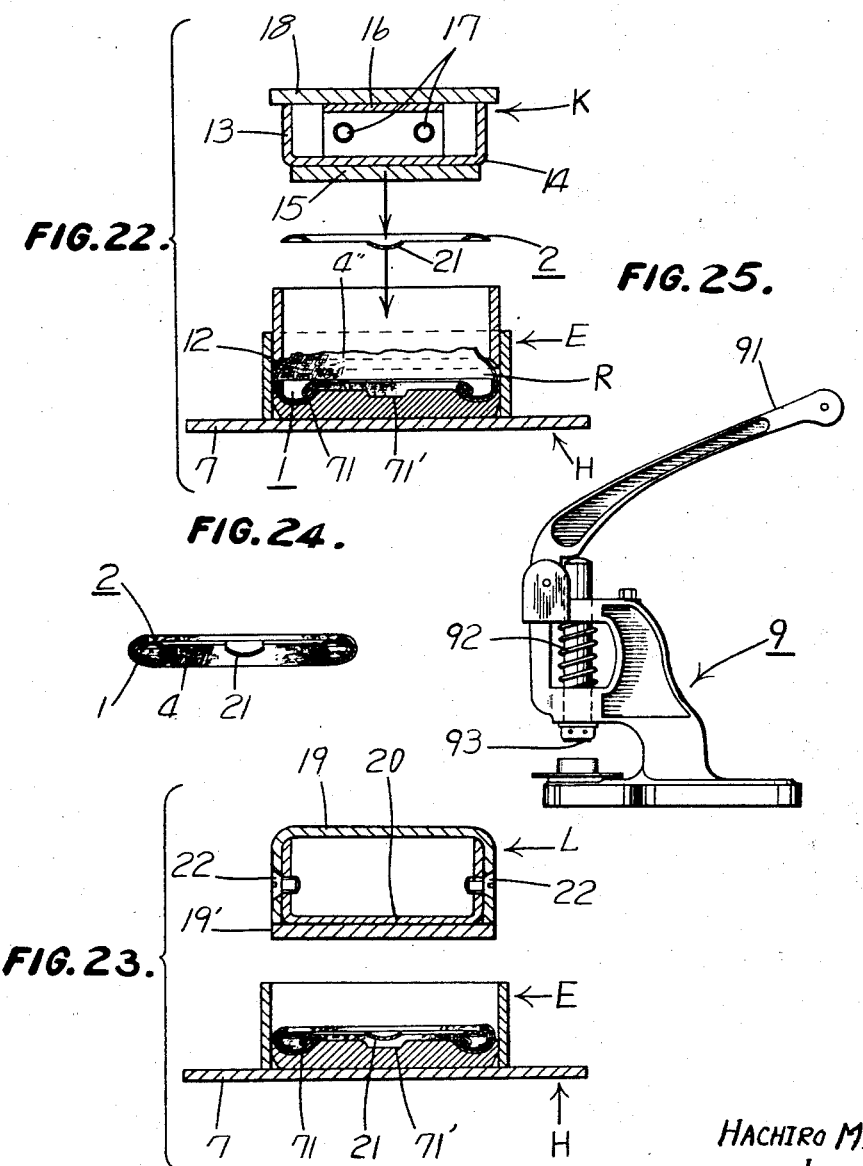

United States Patent Office 3,430,315
Patented Mar. 4, 1969

3,430,315
METHOD OF MANUFACTURING CLOTH-COVERED BELT BUCKLES AND TOOL ASSEMBLY USED THEREIN
Hachiro Mitsui, 700 Inada, Fuse, Osaka, Japan
Filed Sept. 9, 1966, Ser. No. 578,191
U.S. Cl. 29—3       6 Claims
Int. Cl. B21d 53/46

ABSTRACT OF THE DISCLOSURE

A method of manufacturing cloth-covered belt buckles and a tool assembly therefor. The annular cloth covering is first secured to an annular face core by stretching the hole in the cloth and inserting the inner peripheral edge of the face core through the stretched hole and then releasing the cloth. The inner periperal edge of the core is then pressed toward and against the rear surface of the face core by means of a die assembly while holding the core in a lower die to clamp the inner peripheral edge of the cloth between the inner peripheral edge and the face core. The cloth covering is then drawn through the hole in the center of the face core and stretched over the front surface of the face core, and then over the outer peripheral edge of the face core and then laid against the rear surface of the face core. An annular back core is then placed against the cloth over the rear surface of said front core and the outer peripheral edge of said face core is bent inwardly and over and against said back core by means of another die assembly to press said back core tightly against the face core with said cloth held between the back and face cores.

---

The present invention relates to an improvement in a method of manufacturing cloth-covered belt buckles and to a tool assembly used therefor.

The principal object of this invention is to provide a method of efficiently manufacturing cloth-covered belt buckles by a simple operation using special buckle cores and special tools without the necessity of employing a thread and needle, as with the usual method.

Another object of this invention is to provide a method of manufacturing cloth-covered belt buckles by using special buckle cores and special tools whereby the cores are covered with cloth, and the covering cloth is securely attached.

Another object of this invention is to provide a method of manufacturing cloth-covered belt buckles in which the buckle core is composed of a pair of a specially shaped face core and a specially shaped back core, and the back core is inserted into the back side of the core, and the peripheral part of the cloth covering the face of the face core is inserted between and securely held or clamped between these two cores, thereby assuring for the buckle a long service life.

Still another object of this invention is to provide tools for use in manufacturing cloth-covered belt buckles by a simple operation which does not require any special technique or training for providing the necessary cloth cover on the aforementioned special cores.

Another object of this invention is to provide a method which enables repeated manufacture of a number of cloth-covered belt buckles which are identical in shape by using the aforementioned special cores and the tools.

Another object of this invention is to provide a method of manufacturing cloth-covered belt buckles in various shapes by the provision of the aforementioned special cores and the tools.

Other objects and advantages of the invention will be apparent from the following description taken together with the accompanying drawings wherein:

FIGURE 8 is a rear view of another example of a face core;

FIGURE 9 is a cross-sectional view taken along line 9—9 in FIGURE 8;

FIGURE 10 is a rear view of a back core to be used in combination with the face core shown in FIGURE 8;

FIGURE 11 is a cross-sectional view taken along line 11—11 in FIGURE 10;

FIGURE 12 is a perspective view of a primary upper die used for manufacturing the cloth-covered buckle shown in FIGURE 1;

FIGURE 13 is a perspective view of a primary lower die which acts in cooperation with the upper die of FIGURE 12;

FIGURE 14 is a cross-sectional view taken along line 14—14 in FIGURE 12;

FIGURE 15 is a longitudinal cross-sectional view showing the operation of inserting and holding or clamping the inner periphery of the cloth on the inner periphery of the face core by using the aforementioned pair of primary upper and lower dies;

FIGURE 22 is a longitudinal cross-sectional view showing the operation of the assembly shown in FIGURE 16;

FIGURE 23 is a longitudinal cross-sectional view showing the finishing process in which the upper die shown in FIGURES 18 and 19 is used;

FIGURE 24 is a cross-sectional view taken along lines 24—24 in FIGURE 2; and

FIGURE 25 is a side view showing a press.

Figure 1:
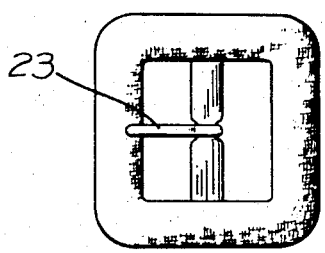
FIGURE 1 is a top plan view of a cloth-covered belt buckle manufactured by the method of this invention.
Figure 4:
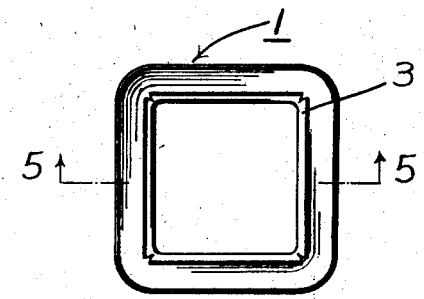
FIGURE 4 is a rear view of a face core to be used in manufacturing the buckle of FIGURE 1.
Figure 2:
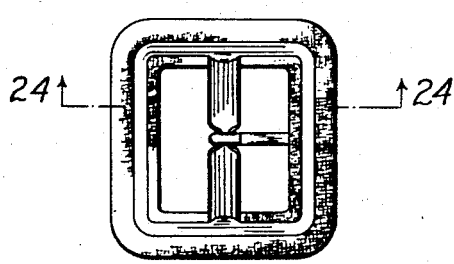
FIGURE 2 is a bottom view of the buckle shown in FIGURE 1.
Figure 5:
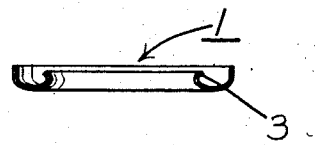
FIGURE 5 is a cross-sectional view taken along line 5—5 in FIGURE 4.

Referring to the drawings, FIGURES 4 through 7 show the core parts to be used in the manufacture of a cloth-covered belt buckle shown in FIGURES 1 and 2, said core parts being a face core 1 and a back core 2, which form a pair. These core parts can be designed to have any shape which it is desired to have for cloth-covered belt buckles, such as a square, circle, ellipse, rectangle, etc. Usually a bridge bar 21 is formed on the back core 2 in a proper position, most usually at the center as shown.

The face core 1, as seen in cross-section, curves outwardly toward the front of the buckle on the outer surface side, and the inner peripheral edge 3 is bent radially outwardly.

Figure 6:
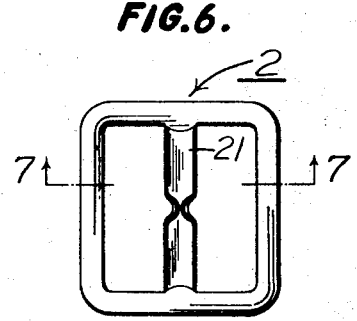
FIGURE 6 is a rear view of a back core to be used in combination with the face core of FIGURE 4.
Figure 3:
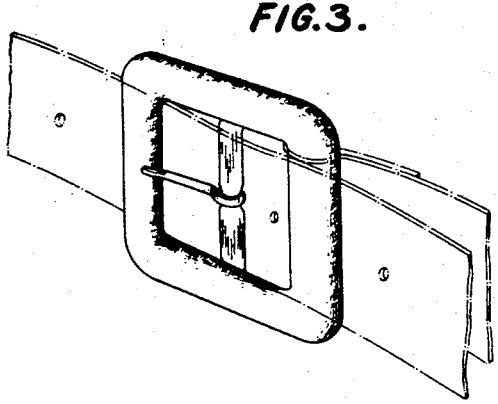
FIGURE 3 is a perspective view of the buckle shown in FIGURE 1 being put to use.
Figure 7:
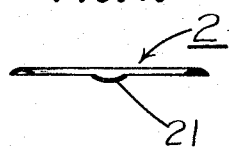
FIGURE 7 is a cross-sectional view taken along line 7—7 in FIGURE 6.
Figure 16:
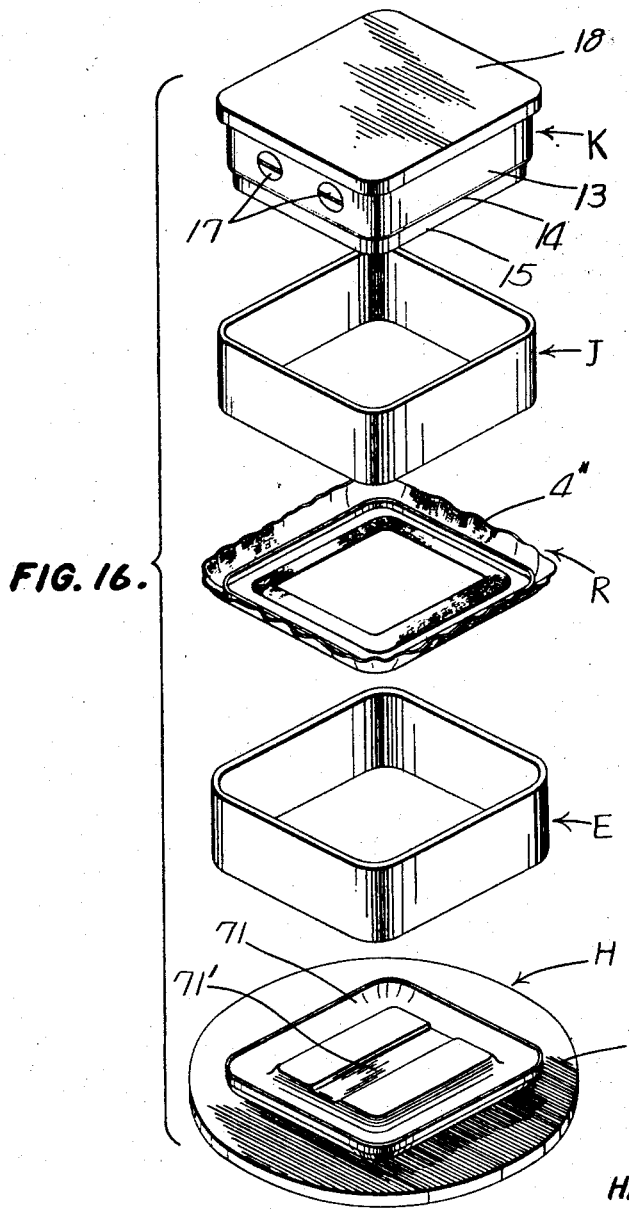
FIGURE 16 is a perspective exploded view of the tools for use in the secondary stage of manufacture.
Figure 17:
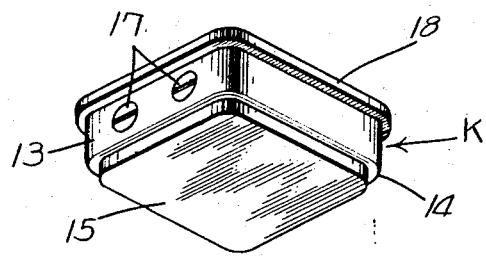
FIGURE 17 is a perspective view of the secondary upper die shown in FIGURE 16.
Figure 18:
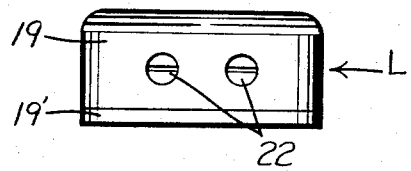
FIGURE 18 is a side view of a finishing upper die.
Figure 19:
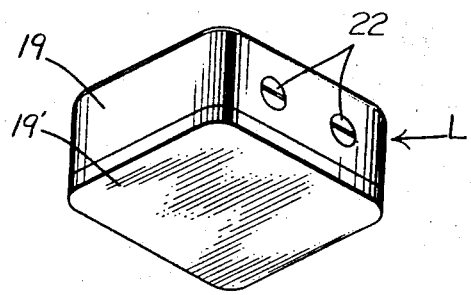
FIGURE 19 is a perspective view of the finishing upper die of FIGURE 18.

FIGURES 6 and 7 show the back core 2 matching the aforementioned face core 1. This back core, as seen in cross-section, curves to the back side of the buckle in an arc, and the central bridge bar 21, also as seen in cross-section, curves in an arc toward the front side of the buckle. This back core 2 is designed so as to be a little smaller than the face core so that it can be freely inserted into the concave back side of the face core 1.

FIGURES 8 through 11 show a modified form of core. This one is the same as the core shown in FIGURES 4–7, except for its overall circular shape. This core is also composed of a face core 1' and a matched back core 2', which form a pair.

The tools for the manufacture of cloth-covered belt buckles according to this invention will now be explained in detail, and, furthermore, the method of manufacturing the cloth-covered belt buckle shown in FIGURES 1 and 24 from the cores shown in FIGURES 4 through 7 by using these tools will be explained in the order of the steps of the manufacturing process.

In the first step, a cloth 4, having an appropriate shape and which is large enough to cover the face core 1, which has at its center a hole fitting to or engageable with the radially outwardly bent portion of the inner periphery 3 of said face core, is prepared. This cloth can be any suitable material such as woven cloth, unwoven cloth, vinyl polymer films, sheets, leather, etc.

Then, the face of the aforementioned cloth 4 is put against the back side of the face core 1. The cloth is stretched by hand to expand the hole therein, and the inner periphery 4 of the face core 1 is inserted in the said hole. When the stretched cloth 4 is released, the hole shrinks and the inner circumferential edge of the cloth 4 engages the neck of the inner periphery 3 of the face core 1, that is, it fits tightly around the neck 3. In this way, a primary assembly P, as shown in FIGURE 20, is obtained.

Figure 20:
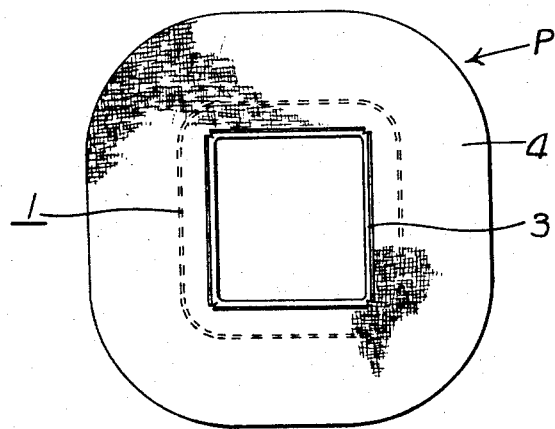
FIGURE 20 is a rear view of a primary assembly of the face core and cover cloth.

In the second step of the manufacture, the inner periphery 3 of the face core 1 of the primary assembly P, shown in FIGURE 20, is pressed outwardly and downwardly to clamp the inner periphery of the cloth 4 tightly.

To accomplish this, the primary upper and lower dies, respectively shown in FIGURES 12 and 13, are used. The primary lower die A, shown in FIGURE 13, has a base plate 5 made of a metal. On the upper surface of the base plate 5 is provided an annular groove 51 in which the face core 1 of the primary assembly P fits with its back facing upward. A seat plate 52 is bonded to the central part of the base plate defined by the groove 51, such as by welding. This seat plate 52 has a predetermined height, and it is so arranged that the face core 1 fits in the groove 51 surrounding the seat plate 52. If desired, this seat plate 52 can be formed integrally with the base plate 5. It is desirable to lapweld a back plate 54, having a large hole at its center, to the bottom surface of the base plate 5, as shown in FIG. 15, thereby reinforcing the base plate.

The primary upper die B is preferably made of metal, and has an inner body 62 having the same bottom surface area as the aforementioned seat plate 52 and an outer body 6 placed adjacent to and surrounding said inner body 62, and extending downwardly beyond the bottom surface of the inner body. In the example shown in the drawing, a metal plate is cut in the shape of a cross, and four flaps are bent into a 90 degree angle with one side of the center portion of the plate, thereby forming the outer body 6 in roughly a box shape. The opening in this outer body 6 is so formed as to fit around the outer circumference of the aforementioned seat plate 52, and the bottom edge of the side walls defining the opening is sloped inwardly and upwardly toward the inner body 62, as shown at 61. The smaller inner body 62 is formed in the same manner, and this latter body is inserted into the outer body 6 as shown in FIGURES 12, 14 and 15, and the two bodies are secured together by means of screws 63. The primary upper die B produced in this way is light in weight, being hollow, and is rigid.

The operation involving the use of the upper and lower dies will now be explained.

First, the primary assembly P of the face core 1 with the cloth 4 attached thereto is mounted on the primary lower die face down. The primary upper die B is placed over this assembly as shown in FIGURE 15, and then the upper die B is pressed down by means of a press 9, such as shown in FIGURE 25. This press 9 is a well-known hand tool, in which, when the handle 91 is pushed down against the force of a spring 92, the plunger 93 descends, pressing down the upper die which is positioned under the plunger.

When the primary upper die B is pressed down in this manner, the sloping wall 61 around the circumference of the opening presses the inner periphery 3 of the face core 1 against the back of the face of the core 1, with the result that the inner periphery 3 is bent or collapsed toward the face portion and clamps the portion of the cloth 4 around the hole therein, thereby securely holding the cloth 4.

It is evident from the above description that the corresponding parts of the lower die A and the upper die B should be designed to have appropriate dimensional relationships so that the grip on the inner periphery of the cloth is obtained when the inner periphery 3 of the aforementioned surface rib 1 is bent or collapsed as explained above.

Then the upper die B is removed and the assembly P wherein the cloth has been clamped by the inner periphery of the surface rib 1 is removed from the die A.

Figure 21:
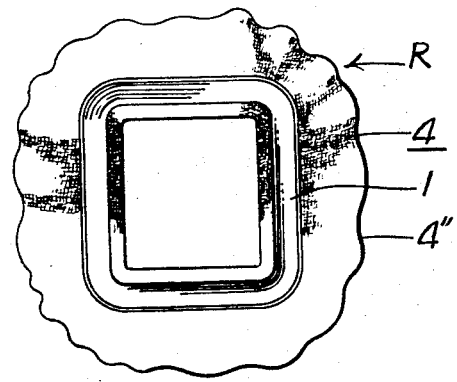
FIGURE 21 is a rear view of a secondary assembling of the core and cover cloth.

In the next stage, a secondary assembly R, such as is shown in FIGURE 21, is produced from the thus treated assembly P by using the upper and lower dies A, B.

The cloth 4 of the assembly P is pulled through the hole in the face core 1 from the back side of the face core 1 to the front face. Then this cloth is stretched all around, with the surface facing out, so as to cover the front surface of the face core 1. In this way, the secondary assembly R, as is shown in FIGURE 21, is prepared.

Then the back core 2 is mounted on and secured to the secondary assembly R in order to form the cloth-covered belt buckle shown in FIGURES 1 and 2.

For this purpose, a set of tools or a forming die assembly H, E, J, K, L, shown in FIGURES 16 through 19, is employed. In these figures, a secondary lower die is designated H, an outer molding frame is designated E, an inner molding frame is designated J, a secondary upper die is designated K, and a finishing upper die is designated L.

In the secondary lower die H is provided an upwardly projecting block on the base plate 7, the block preferably being made of metal. Within the block is an annular groove 71 that is shaped to hold the face core 1 when it is positioned face down in the groove. The cross-sectional contour of the outer circumference of this groove 71 corresponds with the peripheral contour of the face core 1 with the cloth thereon. Furthermore, there is provided in this block a central groove 71 which is shaped to hold the bridge-bar 21 on the back core.

The hollow outer molding frame E has an internal shape which fits closely around the outer circumference of the projecting block on base plate 7.

The outside of the inner molding frame J fits within the inside of the outer molding frame E. The inner molding frame 5 is a short column or cylinder, as shown in FIGURE 22. The peripheral bottom edge 12 of the inner frame J slopes inwardly and upwardly, as shown in FIGURE 22.

The secondary upper die K has a body 13 in the shape of a box having an open top. The external dimensions of said body correspond to the internal dimensions of the inner frame J so that the body 13 will fit closely into the frame J. The outer circumference of the bottom of the body 13 is rounded at 14, and a press plate 15 somewhat smaller than said bottom is lapped and welded to the bottom. It is desirable to insert in the body 13 a reinforcing plate 16 such as shown in FIGURE 22, which is secured to the body 13 by means of screws 17. A rather large flange plate 18 is integrally welded over the upper opening of the body 13. A hollow, light, and pressure-resistant structure is obtained in this way.

The finishing upper die L has a body 19 which is in a shape of a box with an open bottom. A press plate 19', having the same area as the bottom of the body 19' is secured to the bottom of said body by welding. The dimension of this press plate 19' is such that it fits closely into the outer molding frame E, as shown in FIGURE 23. A reinforcing plate 20, such as shown in FIGURE 23, can be positioned in the interior of this die body and is secured to the body 19 by means of screws 22. The structure thus obtained is light in weight and capable of withstanding pressure.

The steps of completing the manufacture of a belt buckle, such as is shown in FIGURE 1, by using the set of tools H, E, J, K, L, will now be described.

First, the outer molding frame E is positioned on the secondary lower die H fitting around the projecting block forming part of said die H. The secondary assembly R is inserted into this outer frame E and placed face down in the groove 71 provided in the secondary lower die H. Then, the inner molding frame J is inserted into the outer frame E, so that the outer circumferential portion 4'' of the cloth 4 forming part of the secondary assembly R is turned inwardly by the sloping edge 12 on the lower edge of the frame J, as illustrated in the lower part of FIGURE 22.

Then the back core 2 is dropped inside the inner frame J in a position in which it corresponds to the grooves 71, 71', as shown in FIGURE 22. This back core 2 is dropped in such a way that its back side comes in contact with the secondary assembly R. The secondary upper die K is inserted into the inner frame J on top of the back core 2, and a downward pressure is applied, for example by the use of a press 9, such as is shown in FIGURE 25.

In this way, the back rib 2 is pressed down by the press plate 15 and forced into the annular groove on the back of the face core 1 of the assembly R, and at the same time the circumferential rim 4'' of the cloth 4 is securely pushed into and between the back core 2 and the back side of the face core 1. Thus, the back core 2 is tightly inserted into and secured to the face core 1, with the circumferential rim of said cloth therebetween.

The buckle so formed is almost complete and can be used as such, if desired. However, it is preferable to subject the same to final finishing. Thus, the secondary upper die K and the inner frame J are removed, and then the finishing upper die L is inserted into the outer molding frame E, as shown in FIGURE 23. This die L is pressed down, for example by the use of a press 9 such as is shown in FIGURE 25. In this way, the periphery of the face core 1 completely press-engages the periphery of the back core 2, as shown in FIGURE 24, and at the same time the cloth 4 is more securely held thereby. Therefore, said cloth 4 not only covers the front face of the core 1, but is trimmed as well.

Finally, a stop bar 23 is secured to the bridge-bar in the usual manner, completing the manufacture of the cloth-covered belt buckle, as shown in FIGURES 1 and 2.

It will be understood from the above description that various forms of cloth-covered belt buckles may be manufactured quite readily and efficiently without requiring any skilled technique and training by preparing the ribs adaptable to the chosen cloth-covered belt buckles and also the simple tools for their manufacture.

What is claimed is:

1. A method of manufacturing cloth-covered belt buckles comprising first securing the cloth covering to a face core which is in the shape of an annular closed geometric figure and has a cross-sectional contour which has the front surface curved convexly toward the front of the buckle and has the rear surface concavely curved and has the inner peripheral edge bent toward the rear surface of the core and then radially outwardly of the core, the cloth covering having a hole in the center thereof, the step of securing comprising stretching the hole in the cloth an inserting the inner peripheral edge of the face core through the stretched hole and then releasing the cloth, and then pressing the said inner peripheral edge toward and against the rear surface of the face core to clamp the inner peripheral edge of the cloth between the inner peripheral edge and the face core; then drawing the cloth covering through the hole in the center of the face core and stretching it over the front surface of the face core, and then over the outer peripheral edge of the face core and then laying it against the rear surface of the face core; and then placing an annular back core having the same geometric shape as said face core and being of a size to fit into the concave rear surface of said face core and being convexly curved outwardly of the buckle against the cloth over the rear surface of said front core and bending the outer peripheral edge of said face core inwardly and over and against said back core to press said back core tightly against the face core with said cloth held between the back and face cores.

2. The method as claimed in claim 1 in which the step of bending the inner peripheral edge of said face core over the inner edge of the cloth comprises placing the face core with the front face down in a lower die having a groove therein which has a shape complementary to that of the face core, and pressing an upper die down against the top of the inner peripheral edge of said face core.

3. The method as claimed in claim 1, in which the step of laying the cloth against the back of the face core comprises placing the face core having the cloth stretched over the front surface thereof and over the outer peripheral edge thereof with the cloth covered side down into an outer frame and in a groove in a secondary lower die having a projection thereon with the groove therein with the projection having an outer periphery corresponding to the outer periphery of the groove and the groove having a shape adapted to receive the face core with the cloth over the front surface thereof, the outer frame surrounding the projection and having an inside shape and dimensions corresponding to the outside shape and dimensions of the projection, and then inserting an inner frame into the outer frame for folding the cloth down against the rear surface of said face core.

4. The method as claimed in claim 3 in which the step of placing the back core against the face core and securing it thereto comprises placing the back core down into the inner frame and then inserting a secondary upper die into said inner frame and engaging the outer peripheral edge of said face core and bending it inwardly and downwardly.

5. The method as claimed in claim 4 in which the step of placing the back core against the face core and securing it thereto further comprises inserting a finishing die into the outer frame after the secondary upper die and inner frame have been withdrawn and pressing the inwardly bent portion of the face core down tightly against the back core.

6. A tool assembly for use in manufacturing cloth-covered belt buckles, comprising a secondary lower die having a base plate having a projection thereon with a groove therein into which the front surface of a face core having the cloth thereover fits, the outer periphery of said projection corresponding to the outer periphery of the groove, an outside frame in the form of a short column and fitting closely around the outer periphery of said projection and groove, a hollow annular inside frame closely fittable into said outer frame and having an inwardly and upwardly sloping lower edge, a secondary upper die closely fittable into said inside frame and having on the bottom thereof a pressure plate slightly smaller than the area of said bottom and having on the top a flange plate somewhat larger than said top, and a finishing upper die fittable into said outside frame and being in the form of an end-closed box and having a pressure plate on the bottom thereof having the same area as the opening of said outer frame.

References Cited

UNITED STATES PATENTS

| | | | |
|---|---|---|---|
| 1,213,695 | 1/1917 | Scutti | 29—3 |
| 1,957,842 | 5/1934 | McDonough | 29—3 |
| 2,254,077 | 8/1941 | Levin | 29—3 |
| 2,841,859 | 7/1958 | Spendel | 29—3 |
| 3,087,227 | 4/1963 | Lerma | 29—3 |
| 3,167,849 | 2/1965 | Eisenpresser | 29—3 |

RICHARD H. EANES, JR., *Primary Examiner.*